United States Patent

Crook, Jr.

[15] 3,653,102
[45] Apr. 4, 1972

[54] HOOK WITH GATE

[72] Inventor: Edward J. Crook, Jr., Fort Wayne, Ind.

[73] Assignee: American Hoist & Derrick Company, St. Paul, Minn.

[22] Filed: July 21, 1970

[21] Appl. No.: 56,764

[52] U.S. Cl. ........................24/241 SL, 24/241 PL, 294/82
[51] Int. Cl. ...........................................A44b 13/00
[58] Field of Search ..................294/78, 82; 24/241, 241 PS, 24/241 SL, 241 PL

[56] References Cited

UNITED STATES PATENTS 2,203,139  6/1940  Grau........................................294/82
3,003,214  10/1961  Geraghty................................294/82

*Primary Examiner*—Harvey C. Hornsby
*Attorney*—Burd, Braddock & Bartz

[57] ABSTRACT

A load handling hook has a safety gate across the throat of the hook. The gate includes a pair of gate members rotatably secured to the shank of the hook to be movable from throat closing to throat clearing relation to selectively prevent and permit disengagement of the load from the hook. A latch includes a locking pin slidably mounted in one gate member and extendible through a slot in the other gate member. This pin has an end cap selectively positionable to be engageable with or in clearing relation to the other gate member to selectively prevent and permit opening of the gate.

5 Claims, 6 Drawing Figures

PATENTED APR 4 1972
3,653,102
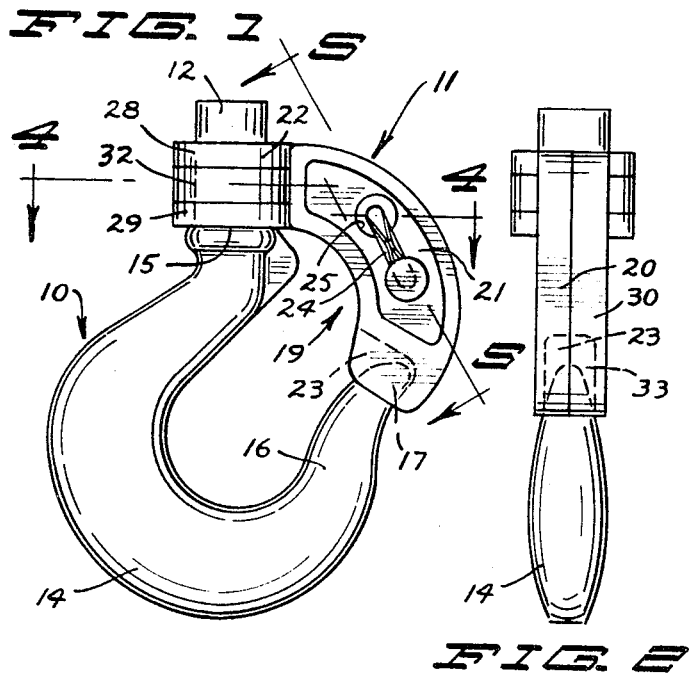
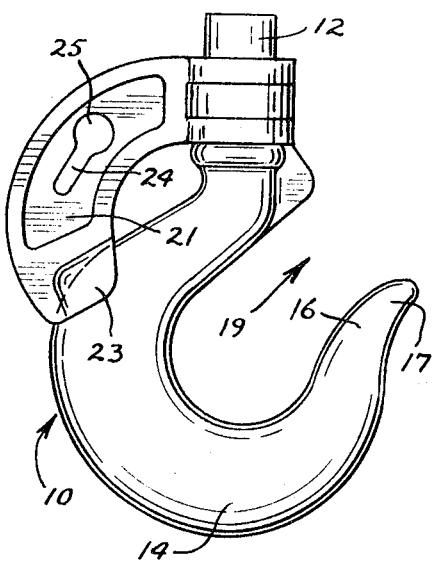
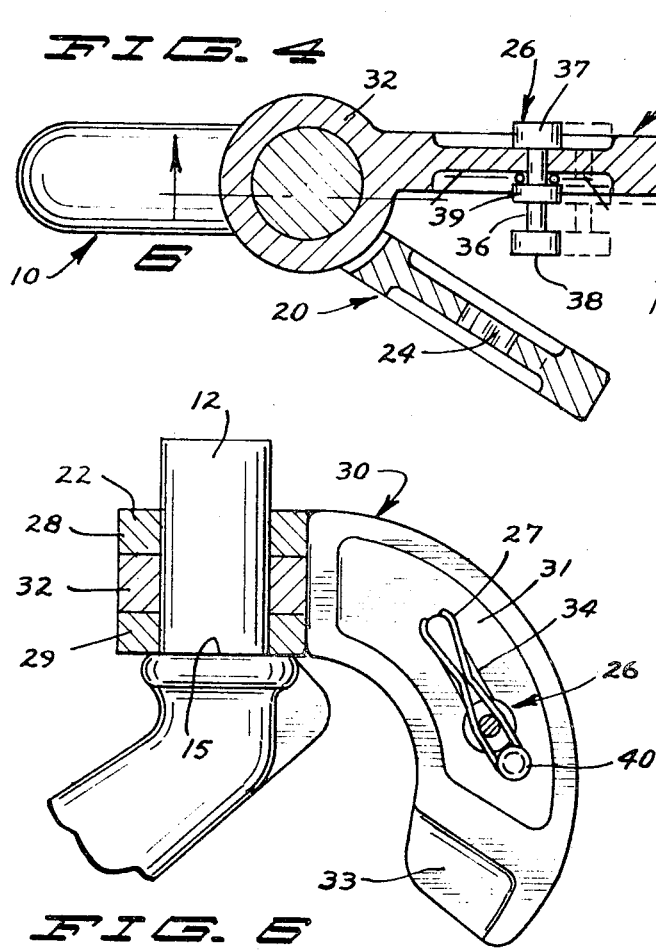
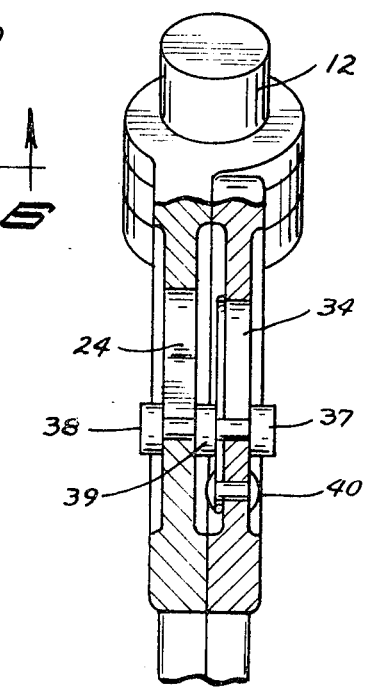
INVENTOR.
EDWARD J. CROOK, JR.
BY
Buid Braddock & Barty
ATTORNEYS

HOOK WITH GATE

BACKGROUND OF THE INVENTION

It is found advantageous to equip load handling hooks for cranes and hoists and the like with gates and latches. For example, see U.S. Pat. No. 3,003,214. Such gates close the throat of the hook to prevent slippage of a load from the hook and the latches control the operation of the gates. Frequently, the gates offer additional strength to the hook. Such gates typically encumber the throat of the hook, thereby restricting passage to the eye of the Typically, typically, any strain on the gate as the load tends to become disengaged or as the hook is overloaded is necessarily borne by the latch. The latch thus becomes the weak and vulnerable link in the unit and is often a source of failure. See also U.S. Pat. No. 892,940. Further latches are often situated so as to receive excessive wear as the gate and hook are used for their intended purposes. See U.S. Pat. No. 1,046,795 and those listed above.

SUMMARY OF THE INVENTION

The invention relates to a hook and in particular to a gate for closing the throat of the hook. The gate includes a pair of gate members rotatably mounted on the shank of the hook adapted to encompass and engage the tip of the hook when in adjacent relationship to each other. When the gate is closed, each of the gate members contacts both the shank of the hook and the tip of the hook, thereby providing additional side-loading strength to the hook. Latch means is provided for the locking together of the gate members to prevent the accidental disengagement of the gate under stress or vibration or the like. Loading on the hook and on the gate members is not transmitted to the latch means. When the latch means is in an open position, the gate members are freely rotatable away from the hook tip to provide access to the eye of the hook through the throat thereof. Distortion of the hook as by excessive loading renders the gate latch inoperable and provides a safety check on the strength of the hook.

An object of the invention is to provide a hook having a gate to prevent the accidental disengagement of a load from the hook. A further object of the invention is to provide a gate which, when opened, will provide unencumbered access to the eye of the hook. Another object of the invention is to provide a gate for a hook having a latch means to prevent the accidental disengagement of the gate. Another object of the invention is to provide a gate which offers resistance to side-loading and does not transmit such loads to the latch means. A still further object is to provide such a gate hook structure in which none of the normal wear on the gate and hook is transmitted to the latch means.

IN THE DRAWINGS

FIG. 1 is a side elevational view of the hook and gate of the invention showing the gate in a closed and latched position;

FIG. 2 is a front elevational view of the hook and gate of FIG. 1;

FIG. 3 is a side view of the hook and gate of the invention showing the gate in an open position;

FIG. 4 is an enlarged sectional view taken along the line 4—4 of FIG. 1;

FIG. 5 is a further enlarged sectional view taken along the line 5—5 of FIG. 1; and FIG. 6 is a sectional view taken along the line 6—6 of FIG. 4.

DESCRIPTION OF A PREFERRED EMBODIMENT

Referring to the drawings, there is shown in FIG. 1 a crane hook, indicated generally at 10. Assembled to the hook 10 is a gate, indicated generally at 11. The hook 10 has a generally C-shaped body portion 14. A hook shank 12 extends upwardly from one end of the body portion 14 and has a shoulder 15 at the lower end. At the end of the body portion 14 opposite the shank 12 is an outwardly curved portion 16 which terminates in an outwardly directed tip 17. The tip 17 is spaced from the lower end of the shank 12 to provide a throat 19 for the hook.

The gate 11, as seen by FIGS. 1 and 2, extends from the shank 12, across the throat 19, and encompasses and engages the tip 17, thereby closing the throat 19. The gate 11 includes a first gate member or arm 20 and a second gate member or arm 30 and releasable latch means for holding the first arm 20 and the second arm 30 in adjacent relationship to each other and to the hook tip 17. The first gate arm 20 has a curved gate portion 21 and, at one end, an integral circular collar 22 which rotatably engages the shank 12. The collar 22 is made up of a pair of spaced apart eyes, including an upper eye 28 and a lower eye 29. The lower eye 29 rests on the shoulder 15. The curved gate portion 21 of the first gate arm 20 curves outwardly and downwardly from the collar 22 to a position adjacent the tip 17 of the hook. At the end of the arm 20 opposite the collar 22 a recess 23 is provided. The portions of arm 20 bounding the recess engage the upper and outer portion of a side of the tip 17 when the arm 20 is in adjacent relationship to the tip 17. In the gate portion 21 there is provided an elongated slot 24 extending transversely through the gate portion 21. As one end of the slot 24, there is provided a circular enlargement 25. As seen by FIG. 6, the second gate arm 30 is generally symmetrical to the first arm 20, having a curved gate portion 31 and an integral circular collar 32 at one end. The collar 32 rotatably engages the shank 12 in the space between the upper eye 28 and the lower eye 29 of the collar 22. The arm 20 and the arm 30 are thus interlocked on the shank 12. The curved gate portion 31 curves outwardly and downwardly from the collar 32 to a position adjacent the tip 17. At the end of the arm 30 opposite the collar 32 a recess 33 is provided. The portions of arm 30 bounding the recess engage the upper and outer portion of the side of the tip 17 opposite to that engaged by the arm 30, when the arms 20 and 30 are each in adjacent relationship to the tip 17. It may be seen that when the gate 11 is closed, the arm 20 and the arm 30 are symmetrically positioned in adjacent relationship to one another and to the tip 17. The recess 23 and the recess 33 mate to form a cavity enclosing the outer and upper portions of the tip 17. The throat 19 of the hook 10 is thereby enclosed. As seen by FIGS. 3 and 4, the gate 11 is opened by rotation of the arm 20 and the arm 30 on the shank 12 away from the tip 17, thereby providing unencumbered access through the throat 19 to the eye of the hook 10. Should the hook 10 become distorted, as by bending from excessive loading, it may be seen that the gate 11 will be inoperative, as the recess 23 and the recess 33 will not receive all of the tip 17. This serves as a warning that the maximum hook load has been exceeded and the hook weakened.

In the gate portion 31 of the arm 30 there is provided an elongated slot 34 extending transversely through this gate portion. The slot 34 is in symmetric alignment with the slot 24 when the arm 30 is in adjacent relationship to the arm 20. The slot 34, however, has not a circular enlargement as does the slot 24.

As best seen by FIGS. 4 and 6, the latch means includes a locking pin 26 and a spring clip 27 in conjunction with the slot 24 and the slot 34. The locking pin 26 is comprised of a shaft 36 having at either end, end caps 37 and 38, and having intermediate between the ends an integral collar 39. That portion of shaft 36 between end cap 37 and collar 39 slides in the slot 34, whereby the locking pin 26 may be moved back and forth in the slot 34 without becoming disengaged from the arm 30. The spring clip 27 is attached to the arm 30 by means of a rivet 40 and is generally in alignment with the slot 34, disposed between the collar 39 and the arm 30. The spring clip 27 engages between its legs the shaft 36, and is adapted to bias the locking pin 26 in either an open position or a locked position. Note that the arm 20 and the arm 30 are cut away to provide clearance for the collar 39 and spring clip 27.

When in the open position, the locking pin 26 is in alignment with the enlargement 25 of the slot 24. When the gate is closed, by rotating the arms 20 and 30 into adjacent relationship with each other, the end cap 38 of the locking pin 26 passes through the enlargement 25 of the slot 24. The locking pin is biased in the open position by the spring clip 27. The gate is locked by the moving of the locking pin to the locking position. The shaft 26 between the end cap 38 and the collar 39 slides into the slot 24. The locking pin is then biased in the locked position by the spring clip 27. The end cap 37 and the end cap 38 prevent movement apart of the arm 20 and the arm 30.

It may be seen that when the gate 11 is in a closed and locked position, a side loading applied to the gate is absorbed independently by the arms 20 and 30, and is not transmitted to the locking pin 26.

The embodiments of the invention in which an exclusive property or privilege is claimed are defined as follows:

1. An improved hook with gate of the type having a shank, a body portion, a tip spaced from the shank thereby providing a throat opening, and a gate selectively movable between an open position clear of said throat and a closed position across said throat opening, wherein the improvement includes:

said gate includes a first arm rotatably mounted on the shank, a second arm rotatably mounted on the shank, said first arm and said second arm being rotatable on said shank to a position of adjacent relationship to each other, adapted together to encompass the tip of the hook when in adjacent relationship to each other, said first arm and said second arm being provided with slots in mutually symmetrical alignment, and releasable latch means operative when said arms are in said adjacent relationship to retain said arms in such relationship, said latch means including a locking pin sliding in one of said slots to be movable between an open position allowing passage of said pin into the other slot and a locked position wherein said pin cannot be removed from said other slot.

2. The hook with gate of claim 1 including:
means to bias said locking pin to always tend to retain its current open position or locked position.

3. The hook with gate of claim 1 wherein: said first arm and said second arm are interlocked on said shank.

4. The hook with gate of claim 1 wherein: said gate outside of and in surrounding relationship to said tip is situated to be in contacting, load bearing relationship to said tip upon spreading of the hook under overload conditions.

5. An improved hook with gate of the type having a shank, a body portion, a tip spaced from the shank thereby providing a throat opening, and a gate selectively movable between an open position clear of said throat and a closed position across said throat opening, wherein the improvement includes:

said gate includes a first arm rotatably mounted on the shank, a second arm rotatably mounted on the shank, independently of said first arm said first arm and said second arm being rotatable on said shank in opposite directions to a position of adjacent relationship to each other, together to encompass the tip of the hook when in adjacent relationship, and releasable latch means being provided between said arms operative when said arms are in said adjacent relationship to retain said arms in such relationship.

* * * * *

PO-1050
(5/69)

UNITED STATES PATENT OFFICE
CERTIFICATE OF CORRECTION

Patent No. 3,653,102          Dated April 4, 1972

Inventor(s) Edward J. Crook, Jr.

It is certified that error appears in the above-identified patent and that said Letters Patent are hereby corrected as shown below:

Column 1, line 11, after "the" (second occurrence), --hook.-- should be added.

Column 1, line 11, second occurrence of "typically" is repetitive and should be omitted.

Column 4, line 22, "said first arm" (second occurrence) is repetitive and should be omitted.

Signed and sealed this 26th day of September 1972.

(SEAL)
Attest:

EDWARD M. FLETCHER, JR.
Attesting Officer

ROBERT GOTTSCHALK
Commissioner of Patents